US012577804B2

(12) United States Patent
Yantis et al.

(10) Patent No.: US 12,577,804 B2
(45) Date of Patent: Mar. 17, 2026

(54) ACCESSIBILITY HANDLE DEVICE FOR A DOMESTIC APPLIANCE

(71) Applicant: Haier US Appliance Solutions, Inc., Wilmington, DE (US)

(72) Inventors: John Adam Yantis, Prospect, KY (US); Olurotimi Joaquim, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 0 days.

(21) Appl. No.: 18/812,130

(22) Filed: Aug. 22, 2024

(65) Prior Publication Data

US 2026/0055634 A1 Feb. 26, 2026

(51) Int. Cl.
*E05B 1/00* (2006.01)
*F25D 23/02* (2006.01)

(52) U.S. Cl.
CPC .......... *E05B 1/0053* (2013.01); *F25D 23/028* (2013.01)

(58) Field of Classification Search
CPC . E05B 1/0053; A45C 13/22; A45C 2013/223; A45F 2005/1053; A47J 45/07; A47J 45/10; B25G 1/102; B25G 3/02; B25G 3/04; B25G 3/06; B25G 3/08; B25G 3/10; B25G 3/12; B25G 3/24; B25G 3/26; B25G 3/28; B25G 3/30; B25G 3/32; B25G 3/36; B25G 3/38; B25G 1/002; B25G 1/005
USPC .......................... 16/406, 413, 422, 423, 426
See application file for complete search history.

(56) References Cited

U.S. PATENT DOCUMENTS 1,410,611 A * 3/1922 Seillon .................. B23G 1/262 408/240
1,503,348 A * 7/1924 Bruhn .................... B62D 1/043 74/557
2,518,755 A * 8/1950 Clarke ................... B25G 1/005 81/177.5
3,156,143 A * 11/1964 Wolf ...................... B25G 1/005 81/177.6

(Continued)

FOREIGN PATENT DOCUMENTS

CH 665538 A5 5/1988
DE 202020001725 U1 5/2020

(Continued)

OTHER PUBLICATIONS

Dallhart, "Door Handles Foot Door Openers, Hands Free Door Opener Sanitary Door Opener Pull Handle for Opening Office Bathroom Outdoor Doors 2Pcs—(Color: Silver)", accessed https://www.amazon.com/Handles-Openers-Sanitary-Opening-Bathroom/dp/B08TRWFB7L?th=1 on Aug. 16, 2024, 4 pages.

*Primary Examiner* — Jeffrey O'Brien
(74) *Attorney, Agent, or Firm* — Dority & Manning, P.A.

(57) ABSTRACT

An accessibility handle device for a domestic appliance may include a pivot. The pivot may define a handle opening. The accessibility handle device may be pivotably disposed around a door handle of the domestic appliance at the handle opening. The accessibility handle device may include a first arm. The first arm may extend from the pivot in a first direction. The accessibility handle device may include a second arm. The second arm may extend from the pivot in a second direction. The second direction may be opposite the first direction.

11 Claims, 9 Drawing Sheets

(56) References Cited

U.S. PATENT DOCUMENTS

| | | | | |
|---|---|---|---|---|
| 3,827,739 | A * | 8/1974 | Overholser | E05B 1/0053 16/DIG. 30 |
| 4,018,465 | A * | 4/1977 | Ramler | E05B 1/0053 292/336.3 |
| 4,023,875 | A | 5/1977 | Difley et al. | |
| 4,276,675 | A * | 7/1981 | Pioch | F16B 7/048 74/544 |
| 4,288,171 | A * | 9/1981 | Kottke | A01G 3/00 403/389 |
| 4,387,483 | A * | 6/1983 | Larrabee | E21B 11/005 175/170 |
| 4,783,883 | A * | 11/1988 | Szalay | E05B 1/0053 16/DIG. 30 |
| 4,817,239 | A * | 4/1989 | Campbell | E05B 1/0053 16/443 |
| 4,829,632 | A * | 5/1989 | Freier | F16K 31/60 16/422 |
| 4,848,846 | A * | 7/1989 | Yamada | A01D 34/90 30/296.1 |
| 4,913,479 | A * | 4/1990 | Allison | E05B 1/0053 292/347 |
| 4,971,375 | A * | 11/1990 | Grecco | E05B 1/0053 292/336.3 |
| 5,231,731 | A * | 8/1993 | Jones, Jr. | E05B 1/0053 16/DIG. 30 |
| 5,375,295 | A * | 12/1994 | Woodward | E05B 1/0053 16/412 |
| 5,638,576 | A * | 6/1997 | Mutone | E05B 1/0053 16/DIG. 30 |
| 5,664,287 | A * | 9/1997 | Sendelbach | E05B 1/0053 292/347 |
| 6,237,274 | B1 * | 5/2001 | Head | B25G 1/06 43/25 |
| 6,390,521 | B1 * | 5/2002 | Bohlman | E05B 1/0053 16/DIG. 24 |
| 6,502,873 | B1 * | 1/2003 | Horseman | E05B 1/0053 292/336.3 |
| 6,550,104 | B2 * | 4/2003 | Cacciacarne | B62B 5/06 D34/27 |
| 6,618,905 | B2 * | 9/2003 | Warashina | A01D 34/90 403/373 |
| 6,751,827 | B1 * | 6/2004 | Fok | E05B 1/0053 16/412 |
| 6,868,584 | B2 * | 3/2005 | Trottier | B62K 11/14 280/304.5 |
| 7,938,464 | B1 * | 5/2011 | Hielm | E05B 1/0053 294/175 |
| 8,166,614 | B2 * | 5/2012 | Martin | B25F 5/026 16/422 |
| 8,181,436 | B1 * | 5/2012 | McMillan | B25G 1/06 56/400.06 |
| 8,453,296 | B2 * | 6/2013 | Swerdlick | B25G 1/102 15/145 |
| 8,621,719 | B2 * | 1/2014 | Nakashima | B25F 5/026 16/422 |
| 8,667,648 | B2 * | 3/2014 | Vierck | A01D 34/416 30/296.1 |
| 8,671,523 | B1 * | 3/2014 | Day | A45F 5/10 16/422 |
| 8,720,116 | B1 * | 5/2014 | Ahmad | E05B 1/0053 16/431 |
| 9,015,904 | B2 * | 4/2015 | Casebier | F16K 31/60 16/422 |
| 9,550,291 | B2 * | 1/2017 | Techlin | A01K 87/08 |
| 10,641,006 | B1 * | 5/2020 | Haile | E05B 1/0053 |
| 2003/0110906 | A1 * | 6/2003 | Li | B25G 1/005 81/177.1 |
| 2004/0195847 | A1 * | 10/2004 | Cali | B25B 13/50 81/15.9 |
| 2009/0000434 | A1 * | 1/2009 | Shinma | B25D 17/04 81/491 |
| 2009/0151503 | A1 * | 6/2009 | Stafford, Jr. | E05B 1/0053 16/412 |
| 2011/0173778 | A1 * | 7/2011 | Wales | B25G 3/20 16/426 |
| 2014/0000170 | A1 * | 1/2014 | Buck | E05B 1/0053 49/353 |
| 2014/0197648 | A1 * | 7/2014 | Brown | E05F 11/54 292/336.3 |
| 2015/0096236 | A1 * | 4/2015 | Ibrahim | A47B 95/02 49/506 |
| 2016/0121476 | A1 * | 5/2016 | Techlin | A01K 87/085 16/426 |
| 2022/0010583 | A1 * | 1/2022 | Brenner | G09F 3/00 |
| 2022/0010584 | A1 * | 1/2022 | Brenner | E05B 1/0069 |
| 2022/0333404 | A1 * | 10/2022 | McIntire | E05B 1/0069 |
| 2023/0076904 | A1 * | 3/2023 | Cooper | E05B 1/0084 |
| 2023/0339030 | A1 * | 10/2023 | Fiddes | B25G 1/002 |
| 2024/0141687 | A1 * | 5/2024 | Dang | B25G 3/20 |

FOREIGN PATENT DOCUMENTS

| | | | |
|---|---|---|---|
| DE | 202020102169 | U1 | 5/2020 |
| GB | 2183724 | A | 6/1987 |
| JP | 2003148005 | A | 5/2003 |
| KR | 20060082263 | A | 7/2006 |

* cited by examiner

ACCESSIBILITY HANDLE DEVICE FOR A DOMESTIC APPLIANCE

FIELD OF THE DISCLOSURE

The present subject matter relates generally to a domestic appliance, and more particularly to a device for improving the accessibility of the domestic appliance.

BACKGROUND OF THE DISCLOSURE

Domestic appliances (e.g., refrigerators, ovens, microwaves, etc.) typically include doors or drawers that selectively permit access to certain receiving spaces within the appliance. For example, a user may open or close the doors or drawer to selectively access chilled food storage chambers within a refrigerator appliance, cooking chambers within an oven appliance, wash chambers within a dishwasher appliance, or the like. These doors or drawers can include handles attached thereto. The handles can be grasped and pulled or pushed by a user to gain access to the receiving space via the door or drawer. The handles include connection points at which the handle is connected to the appliance (e.g., the door or drawer).

However, some users of domestic appliances have decreased dexterity, for instance, in their hands. This can limit their ability to properly grasp the handles to open or close the doors or drawers of the domestic appliance. For example, some users may have a decreased grasping ability of their hands caused by age, injuries, or disabilities. These deficiencies may limit a user's ability to grasp the door handles. As another example, some users can be holding objects or items (e.g., food, children, etc.) when attempting to open or close the doors or drawers. The objects or items that the user is holding may not allow them to properly grasp the handle to open or close the doors or drawers of the domestic appliance.

Accordingly, a device for a domestic appliance that obviates one or more of the above-mentioned drawbacks would be useful.

BRIEF DESCRIPTION OF THE DISCLOSURE

Aspects and advantages of the invention will be set forth in part in the following description, or may be obvious from the description, or may be learned through practice of the invention.

In one exemplary aspect of the present disclosure, an accessibility handle device for a domestic appliance is provided. The domestic appliance may include a door. The door may include a door handle. The accessibility handle device may include a pivot. The pivot may define a handle opening. The accessibility handle device may be pivotably disposed around the door handle at the handle opening. The accessibility handle device may include a first arm extending from the pivot in a first direction. The accessibility handle device may include a second arm extending from the pivot in a second direction. The second direction may be opposite the first direction.

In another exemplary aspect of the present disclosure, an accessibility handle device for a domestic appliance is provided. The domestic appliance may include a door, The door may include a door handle. The accessibility handle device may include a pivot defining a handle opening. The handle opening may have a circular cross-sectional area. The accessibility handle device may be pivotably disposed around the door handle at the handle opening such that the door handle extends through the circular cross-sectional area of the handle opening. The accessibility handle device may include a first arm extending from the pivot in a first direction. The first arm may be tangential to the handle opening. The accessibility handle device may include a second arm extending from the pivot in a second direction. The second arm may be tangential to the handle opening. The second direction being opposite to the first direction. One of the first arm or the second arm may be engageable with the door.

In yet another exemplary aspect of the present disclosure, an accessibility handle device for a domestic appliance is provided. The domestic appliance may include a door. The door may include a door handle. The accessibility handle device may include a pivot defining a handle opening. The handle opening may have a semi-circular sectional area. The accessibility handle device may be pivotably disposed around the door handle at the handle opening such that the door handle extends through the semi-circular cross-sectional area of the handle opening. The accessibility handle device may include a first arm extending from the pivot in a first direction. The accessibility handle device may include a second arm being in an in-line arrangement with the first arm. The second arm may extend from the pivot in a second direction. The second direction may be opposite to the first direction. One of the first arm or the second arm is engageable with the door.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
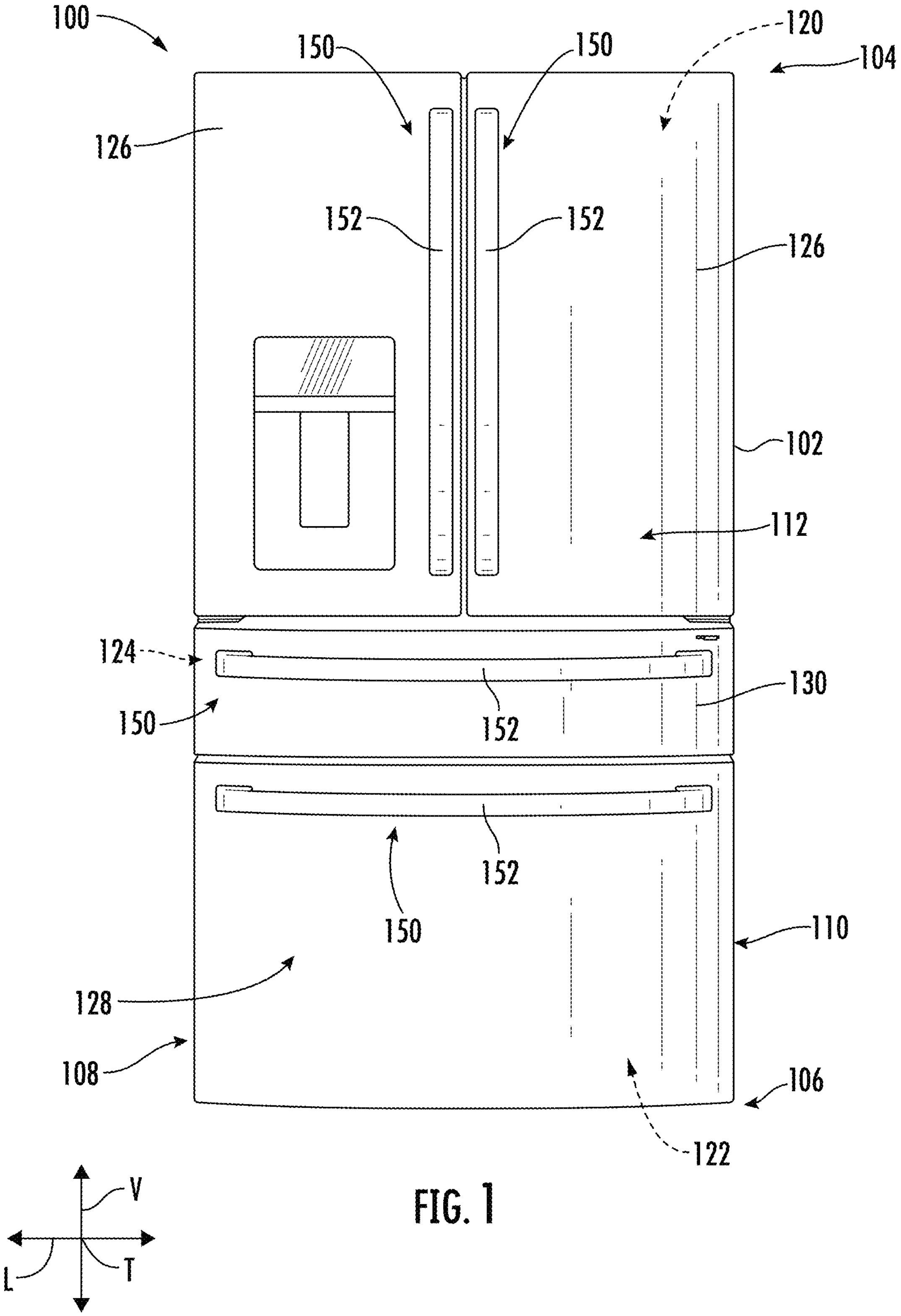
FIG. 1 provides a front view of a refrigerator appliance according to one or more exemplary embodiments of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, reference to "an embodiment" or "one embodiment" does not necessarily refer to the same embodiment, although it may. Any implementation described herein as "exemplary" or "an embodiment" is not necessarily to be construed as preferred or advantageous over other implementations.

Except as explicitly indicated otherwise, recitation of a singular processing element (e.g., "a controller," "a processor," "a microprocessor," etc.) is understood to include more than one processing element. In other words, "a processing element" is generally understood as "one or more processing element." Furthermore, barring a specific statement to the contrary, any steps or functions recited as being performed by "the processing element" or "said processing element" are generally understood to be capable of being performed by "any one of the one or more processing elements." Thus, a first step or function performed by "the processing element" may be performed by "any one of the one or more processing elements," and a second step or function performed by "the processing element" may be performed by "any one of the one or more processing elements and not necessarily by the same one of the one or more processing elements by which the first step or function is performed." Moreover, it is understood that recitation of "the processing element" or "said processing element" performing a plurality of steps or functions does not require that at least one discrete processing element be capable of performing each one of the plurality of steps or functions.

As should be appreciated, the terms "domestic appliance," "household appliance," or the like are used herein to describe appliances typically used or intended for common domestic tasks. According to still other embodiments, these "appliances" may include but are not limited to a refrigerator appliance, a dishwasher, a microwave oven, a cooktop, an oven, a washing machine, a dryer, and any other domestic or household appliance that includes a door handle that a user may grasp to manipulate a position of an exterior door or drawer thereof.

Domestic appliances can include door handles for opening exterior doors or drawers thereof. For example, the door handles can provide a user with a gripping location to open the doors or drawers. Typically, door handles for domestic appliances are designed for users that have full gripping capability of their hands or fingers. In other words, existing door handles of domestic appliances are not designed for users that have lost hand gripping abilities (e.g., due to injury, age, disability, etc.). In addition, existing door handles may be difficult to use when the user's hands are full, or otherwise encumbered. For example, when the user is holding an object or item, such a food, a cooking utensil, a child, etc. Thus, in some cases, it can be difficult for a user to open doors or drawers of domestic appliances via the door handles. In such instances, the user may require another individual's assistance to open or close the door or drawer of the domestic appliance. In extreme cases, the user may be prevented from using the domestic appliance altogether as they are not capable of opening or closing the doors or drawers of the domestic appliance.

Notably, embodiments of the present subject matter provide a accessibility handle device that advantageously reduces or mitigates difficulties associated with grasping appliance handles. The accessibility handle device may advantageously be pivotably attached to door handles of domestic appliances to increase the usability or accessibility of the door handles.

Referring now to the figures, FIG. 1 provides a perspective view of a refrigerator appliance 100 according to an exemplary embodiment of the present subject matter. Refrigerator appliance 100 includes a cabinet 102 that extends between a top 104 and a bottom 106 along a vertical direction V, between a first side 108 and a second side 110 along a lateral direction L, and between a front side 112 and a rear side (not shown) along a transverse direction T. Each of the vertical direction V, lateral direction L, and transverse direction T are mutually perpendicular to one another and form an orthogonal direction system.

Cabinet 102 defines chilled chambers for receipt of food items for storage. In particular, cabinet 102 defines fresh food chamber 120 positioned at or adjacent top 104 of cabinet 102 and a freezer chamber 122 arranged at or adjacent bottom 106 of cabinet 102. Optionally, an auxiliary food storage chamber 124 may be positioned between the fresh food chamber 120 and the freezer chamber 122, e.g., along the vertical direction V. As such, refrigerator appliance 100 is generally referred to as a bottom mount refrigerator appliance. It is recognized, however, that the benefits of the present disclosure apply to other types and styles of appliances such as, e.g., a top mount refrigerator appliance, a side-by-side style refrigerator appliance, or a single door refrigerator appliance, dishwashing appliances, microwave appliances, oven appliances, or the like.

Refrigerator doors 126 are rotatably hinged to an edge of cabinet 102 for selectively accessing fresh food chamber 120. In addition, a freezer door 128 and an auxiliary door 130 are arranged below refrigerator doors 126 for selectively accessing freezer chamber 122. Freezer door 128 is coupled to a freezer drawer (not shown) slidably mounted within freezer chamber 122. To prevent leakage of cool air, refrigerator doors 126, freezer door 128, auxiliary door 130, or cabinet 102 may define one or more sealing mechanisms (e.g., rubber gaskets, not shown) at the interface where the doors 126, 128, 130 meet cabinet 102. It should be appreciated that doors having a different style, position, or configuration are possible within the scope of the present subject matter.

Refrigerator appliance 100 may include one or more door handles 150. For example, a first door handle 150 may be attached to freezer door 128, a second door handle 150 may be attached to auxiliary door 130, and third and fourth door handle 150 may be attached to refrigerator doors 126. Each door handle 150 may include a handle tube 152. The handle tube(s) 152 may be oriented in a horizontal position (e.g., parallel to the lateral direction L) or a vertical position (e.g., parallel to the vertical direction V). For example, the handle tube 152 may be a relatively long, slender, generally hollow, tube that is used by a user to grasp door handle 150 and manipulate the position of a door (e.g., refrigerator door 126, freezer door 128, or auxiliary door 130) of the refrigerator appliance 100. In this regard, when installed, handle tube 152 may be spaced apart from the door of the refrigerator appliance 100 such that a user may grasp handle tube 152 to pull open the door of the refrigerator appliance 100. In the illustrated embodiment, handle tube 152 has a closed, generally trapezoidal cross section. According to some embodiments, handle tube 152 may be cylindrical in cross section, while in others, other closed, generally hollow cross sections may be used. According to the illustrated exemplary embodiment, handle tube 152 may be curved.

Figure 2:
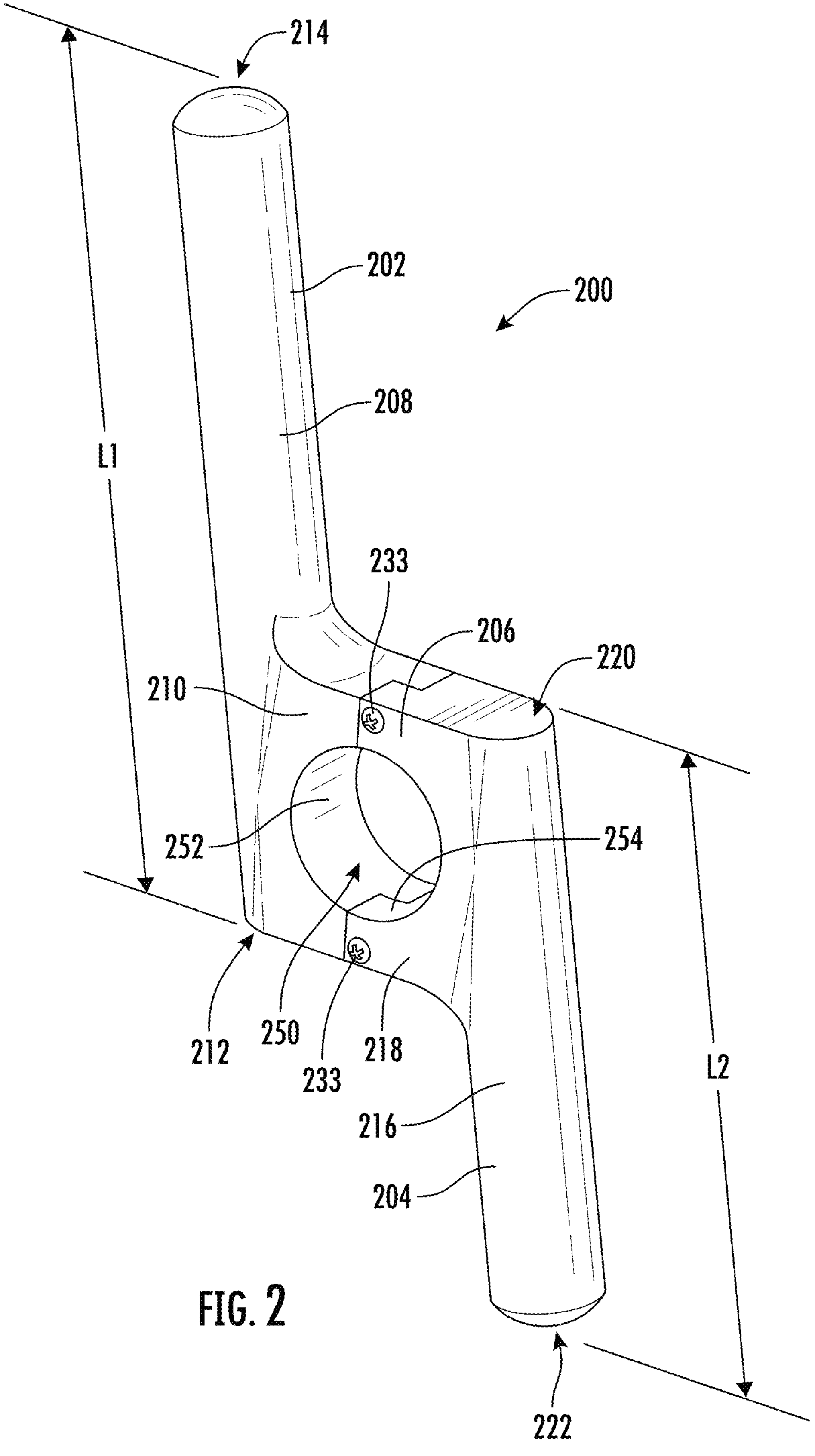
FIG. 2 provides a perspective view of an accessibility handle device according to one or more exemplary embodiments of the present subject matter.
Figure 3:
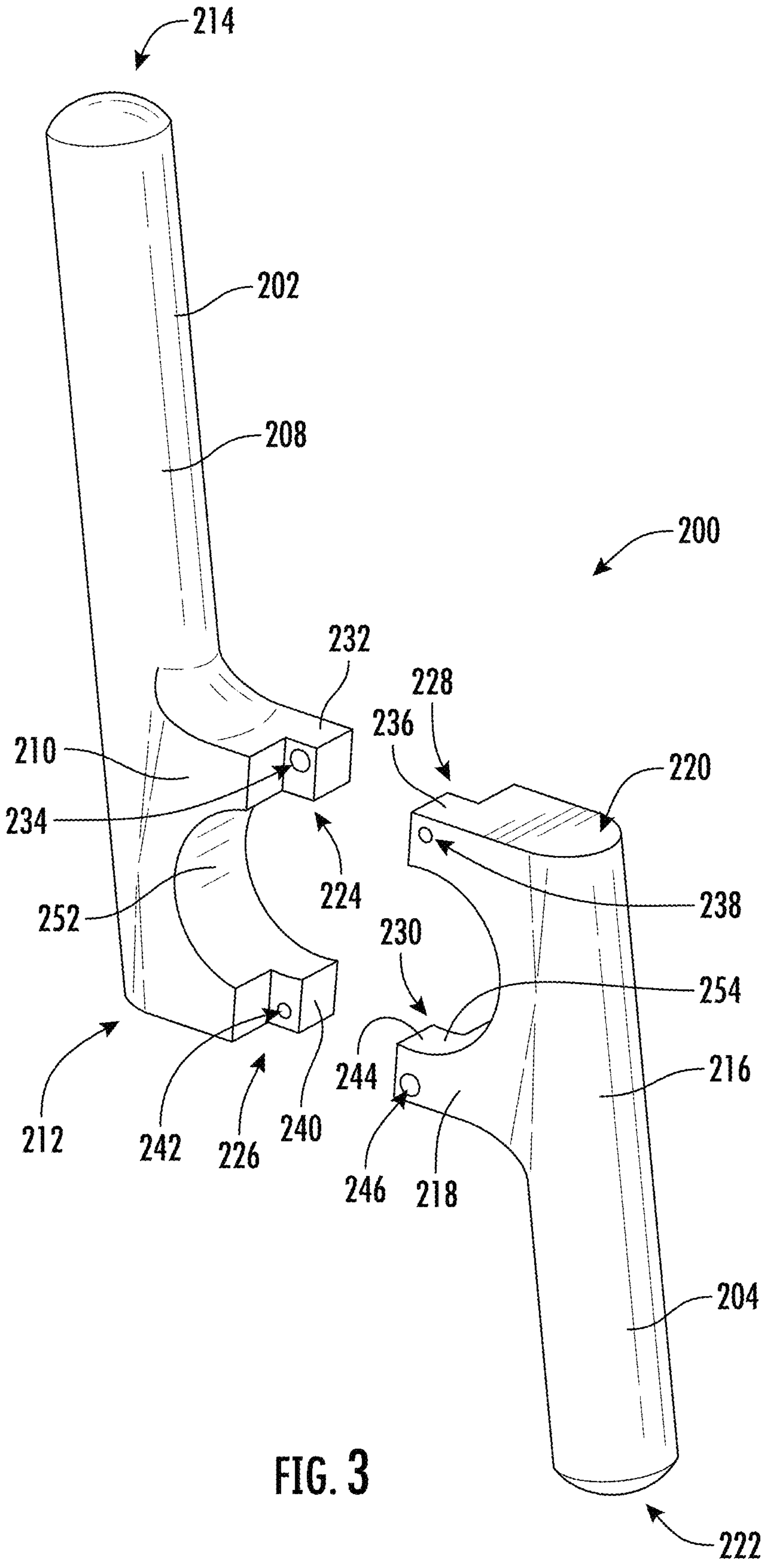
FIG. 3 provides an exploded view of the accessibility handle device of FIG. 2.

Referring now to FIGS. 2 and 3, embodiments of an accessibility handle device 200 are provided. Specifically, FIG. 2 provides a perspective view of the accessibility handle device 200 and FIG. 3 provides an exploded view of the accessibility handle device 200. As will be described in more detail below, the accessibility handle device 200 may be pivotably attached to a door handle of a domestic appliance to assist in the opening or closing of doors or drawers of the domestic appliance. For example, the accessibility handle device 200 may be pivotably attached to door handles 150 of refrigerator appliance 100 to assist in the opening or closing of the doors or drawers (e.g., refrigerator doors 126, freezer door 128, or auxiliary door 130) of the refrigerator appliance 100.

In some embodiments, the accessibility handle device 200 includes a first arm 202 and a second arm 204. Generally, the first arm 202 and the second arm 204 may be fastened together to form a pivot body 206 of the accessibility handle device 200. In some embodiments, the first arm 202 includes a first engagement body 208 and a first arcuate body 210. The first engagement body 208 may extend (e.g., from pivot body 205) between a proximal end 212 and a distal end 214. The first engagement body 208 may define a first length L1 (e.g., FIG. 2) measured between the proximal end 212 of the first engagement body 208 and the distal end 214 of the first engagement body 208. The first arcuate body 210 may be disposed at, or fixed to, the proximal end 212 of the first engagement body 208. The second arm 204 may include a second engagement body 216 and a second arcuate body 218. The second engagement body 216 may extend between a proximal end 220 and a distal end 222. The second arm 204 may define a second length L2 (e.g., FIG. 2) between the proximal end 220 of the second arm 204 and the distal end 222 of the second arm 204.

The first arm 202 and the second arm 204 may define lengths that are different. For example, one of the first length L1 or the second length L2 may be larger than the other. As is illustrated in FIGS. 2 and 3, the first length L1 may be larger than the second length L2. For example, the first length may be at least twenty-five percent (25%) larger than the second length, such as at least thirty-five percent (35%) larger than the second length, such as at least fifty percent (50%) larger than the second length.

As illustrated in FIGS. 2 and 3, the first arm 202 and the second arm 204 of the accessibility handle device 200 may generally define a cylindrical shape. The cylindrical shape may advantageously provide a comfortable engagement surface for a user of the domestic appliance while also provided adequate surface area to engage with a door of the domestic appliance.

However, it should be appreciated that in additional or alternative embodiments, the first engagement body 208 or the second engagement body 216 may define another suitable shape for engaging with a door of the domestic appliance and an appendage of a user of the domestic appliance.

The first arm 202 and the second arm 204 may extend from the pivot body 206 in opposite directions. For example, the first arm 202 may extend from the pivot body 206 in a first direction and the second arm 204 may extend from the pivot body 206 in a second direction that is opposite of the first direction. When the accessibility handle device 200 is attached to a door handle of a domestic appliance, the first direction and the second direction may generally extend perpendicular to the door handle. For example, when the accessibility handle device 200 is attached to a vertically oriented door handle (e.g., door handle 150 of the refrigerator doors 126 of refrigerator appliance 100), the first direction and the second direction may extend generally along a lateral direction of the domestic appliance (e.g., lateral direction L of refrigerator appliance 100). As another example, when the accessibility handle device 200 is attached to a horizontally oriented door handle (e.g., door handle 150 of the freezer doors 128 of refrigerator appliance 100), the first direction and the second direction may extend generally along a vertical direction of the domestic appliance (e.g., vertical direction V of refrigerator appliance 100).

As illustrated, the first arm 202 may extend in the first direction tangentially to a handle opening 250 (e.g., described in more detail below) and the second arm 204 may extend in the second direction tangentially to the handle opening 250. In this regard, the first arm 202 and the second arm 204 may positioned in a “parallel arrangement.” In the parallel arrangement, the first arm 202 and the second arm 204 may be offset from one The first arcuate body 210 and the second arcuate body 218 may be fastened together to form the pivot body 206 of the accessibility handle device 200. The first arcuate body 210 may extend between a first end 224 and a second end 226 (e.g., FIG. 3). The second arcuate body 218 may extend between a first end 228 and a second end 230 (e.g., FIG. 3). The first end 224 of the first arcuate body 210 and the first end 228 of the second arcuate body 218 may be mechanically fastened together. Specifically, the first end 224 of the first arcuate body 210 may include a first attachment block 232 defining a first fastener hole 234 of the first arcuate body 210. The first end 228 of the second arcuate body 218 may include a first attachment block 236 defining a first fastener hole 238 of the second arcuate body 218. The first fastener hole 234 of the first arcuate body 210 may be aligned with the first attachment hole of the second arcuate body 218.

The second end 226 of the first arcuate body 210 and the second end 230 of the second arcuate body 218 may be mechanically fastened together. Specifically, the second end 226 of the first arcuate body 210 may include a second attachment block 240 defining a second fastener hole 242 of the first arcuate body 210. The second end 230 of the second arcuate body 218 may include a second attachment block 244 defining a second fastener hole 246 of the second arcuate body 218. The second fastener hole 242 of the first arcuate body 210 may be aligned with the second fastener hole 246 of the second arcuate body 218.

In some embodiments, fasteners 233 may be disposed within the aligned fastener holes (e.g., within the first fastener holes 234, 238 and within the second fasteners holes 242, 246) to mechanically fasten the first arcuate body 210 to the second arcuate body 218. For example, mechanical fasteners such as screws, bolts, or the like may be disposed within the aligned fastener holes to secure and fasten the first arcuate body 210 to the second arcuate body 218. In some embodiments, the fasteners 233 may be removable fasteners. For example, the fasteners 233 may be designed specifically to join the first arcuate body 210 and the second arcuate body 218, with the option to be removed and reused without damaging the first arcuate body 210 and the second arcuate body 218. In particular, the removability of the fasteners 233 advantageously allows the accessibility handle device 200 to be placed onto, or taken off, a door handle of a domestic appliance at a user’s convenience.

When fastened together, the first arcuate body 210 and the second arcuate body 218 may define a handle opening 250. Specifically, the first arcuate body 210 may include a first curved inner surface 252 and the second arcuate body 218 may include a second curved inner surface 254. The first curved inner surface 252 and the second curved inner surface 254 may together form a circular handle opening 250. For instance, the circular handle opening 250 may define a circular cross-sectional area.

As should be appreciated, the shape and size of the handle opening 250 may be configured such that the accessibility handle device 200 may be capable of pivoting about a door handle of a domestic appliance. Additionally, the shape and size of the handle opening 250 may be configured such that the accessibility handle device 200 may be capable of sliding freely along a length of the door handle. For example, the accessibility handle device 200 may be loosely fit around the door handle such that the accessibility handle device may be freely moved generally along the vertical direction V relative to the door handle 150 or the lateral direction L depending on an orientation of the door handle. This advantageously allows a user to be able to exert a one-directional force for easier single-appendage opening of the door. Additionally, or alternatively, the handle attachments loose fit around the door handle advantageously allows for easy repositioning of the accessibility handle device relative to the door handle. Thus, access to features (e.g., controls knobs, input selectors, etc.) of the domestic appliance can be maintained.

Figure 4:
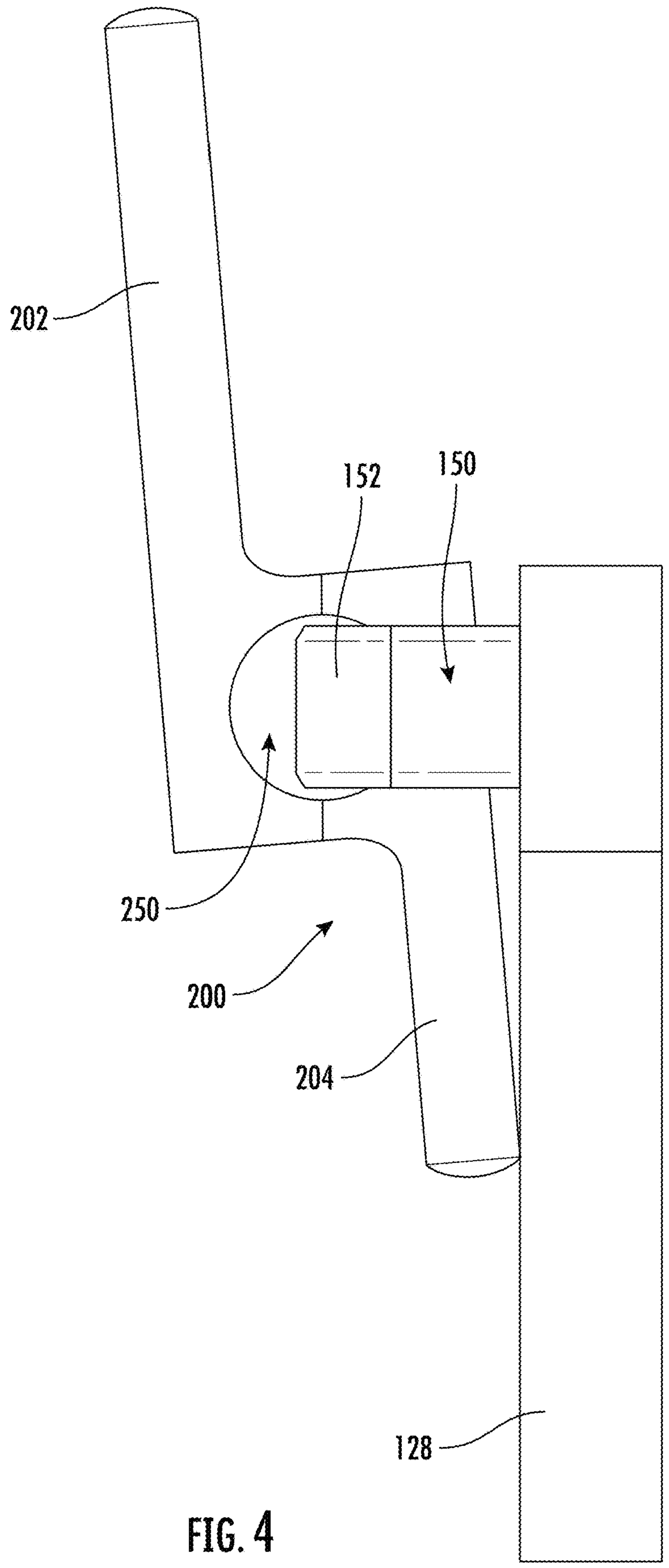
FIG. 4 provides a side view of the exemplary accessibility handle device of FIG. 2 pivotably attached to a door handle of the exemplary refrigerator appliance of FIG. 1, wherein the accessibility handle device is oriented in a first orientation.
Figure 5:
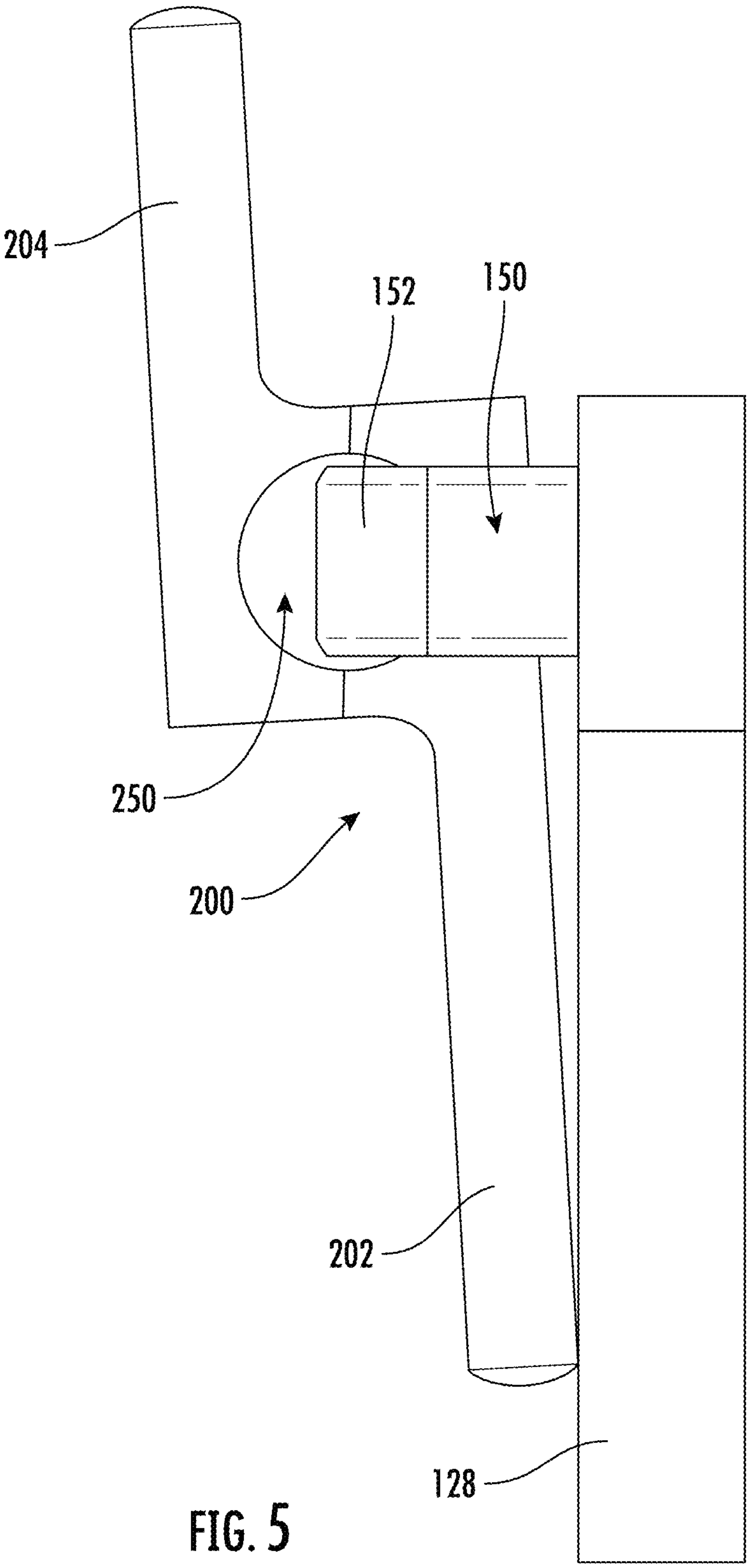
FIG. 5 provides a side view of the exemplary accessibility handle device of FIG. 2 pivotably attached to a door handle of the exemplary refrigerator appliance of FIG. 1, wherein the accessibility handle device is oriented in a second orientation.

Referring now to FIGS. 4 and 5, embodiments of the accessibility handle device 200 pivotably attached to door handle 150 of the freezer door 128 are provided. Specifically, FIG. 4 illustrates the accessibility handle device 200 in a first orientation relative to the door 128 and FIG. 5 illustrates the accessibility handle device 200 in a second orientation relative to the door 128. In general, one of the first arm 202 or the second arm 204 may be engageable the freezer door 128 of the refrigerator appliance 100 based on the orientation of the accessibility handle device 200 relative to the door.

When the accessibility handle device 200 is in the first orientation (e.g., FIG. 4), the second arm 204 may be engageable with the freezer door 128. Notably, in the first orientation, the first arm 202 (e.g., the longer arm) may be provided for a user to engage with. For instance, the first arm 202 may extend outward from the door handle 150 such that a user may apply a force to the first arm 202 to open the freezer door 128. As the first arm 202 is the longer of the two arms, the first orientation of the accessibility handle device 200 may advantageously provide a relatively large amount of surface area to engage with (e.g., when compared to the surface area of the second arm 204).

In some cases, when the accessibility handle device 200 is pivotably attached to the door handle 150 the arm that may be engaged by the user may obstruct access to certain features of the appliance. For example, the arm that may be engaged by the user may obstruct control knobs, user interface, or the like. In such cases, the accessibility handle device 200 may be oriented in the second orientation. When the accessibility handle device 200 is in the second orientation (e.g., FIG. 5), the first arm 202 (e.g., the longer arm) may be engageable with the freezer door 128. In addition, in the second orientation, the second arm 204 may be engageable by the user. For instance, the second arm 204 may extend outward from the door handle 150 such that a user may apply a force to the second arm 204 to open the freezer door 128. When the accessibility handle device 200 is oriented in the second orientation, features of the appliance that a user may interact with (e.g., control knobs, user interfaces, or the like) may have more clearance, and therefore may be more accessible (e.g., when compared to the accessibility of such features when the accessibility handle device 200 is in the first orientation).

Figure 6:
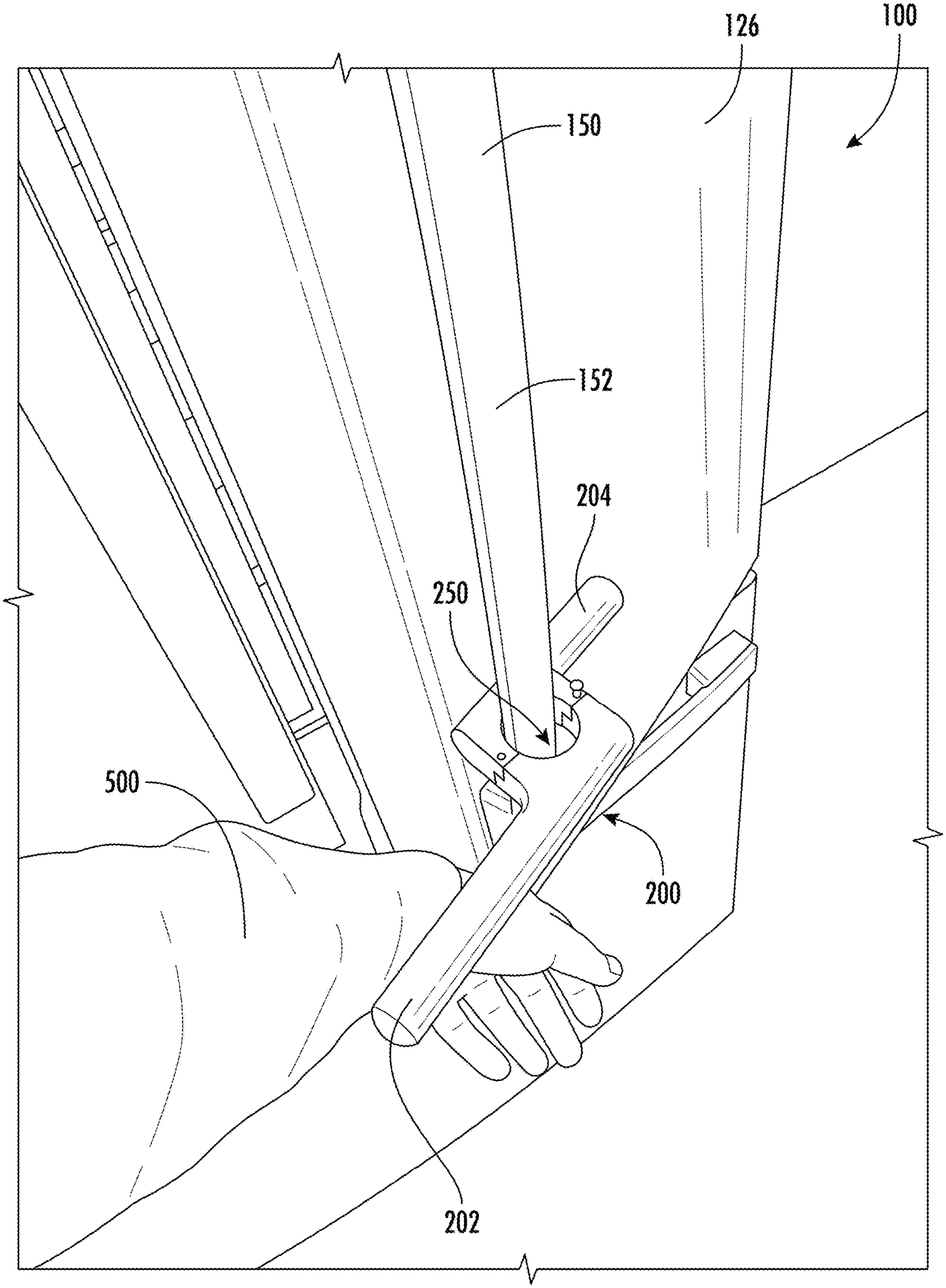
FIG. 6 provides a perspective view of the exemplary accessibility device of FIG. 2 attached to a door handle of a refrigerator door of the exemplary refrigerator appliance of FIG. 1.
Figure 7:
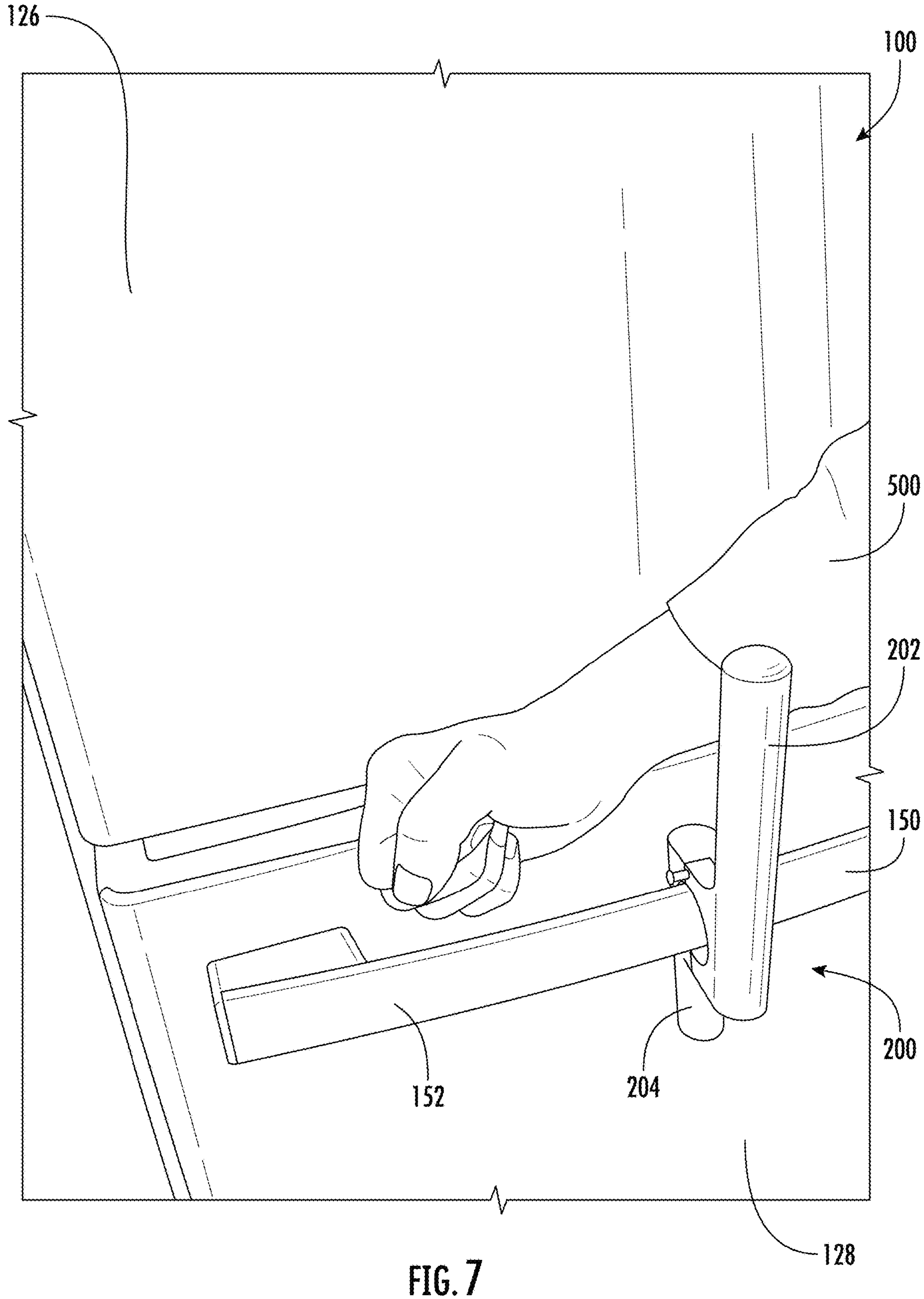
FIG. 7 provides a perspective view of the exemplary accessibility device of FIG. 2 attached to a door handle of a freezer door of the exemplary refrigerator appliance of FIG. 1.
Figure 8:
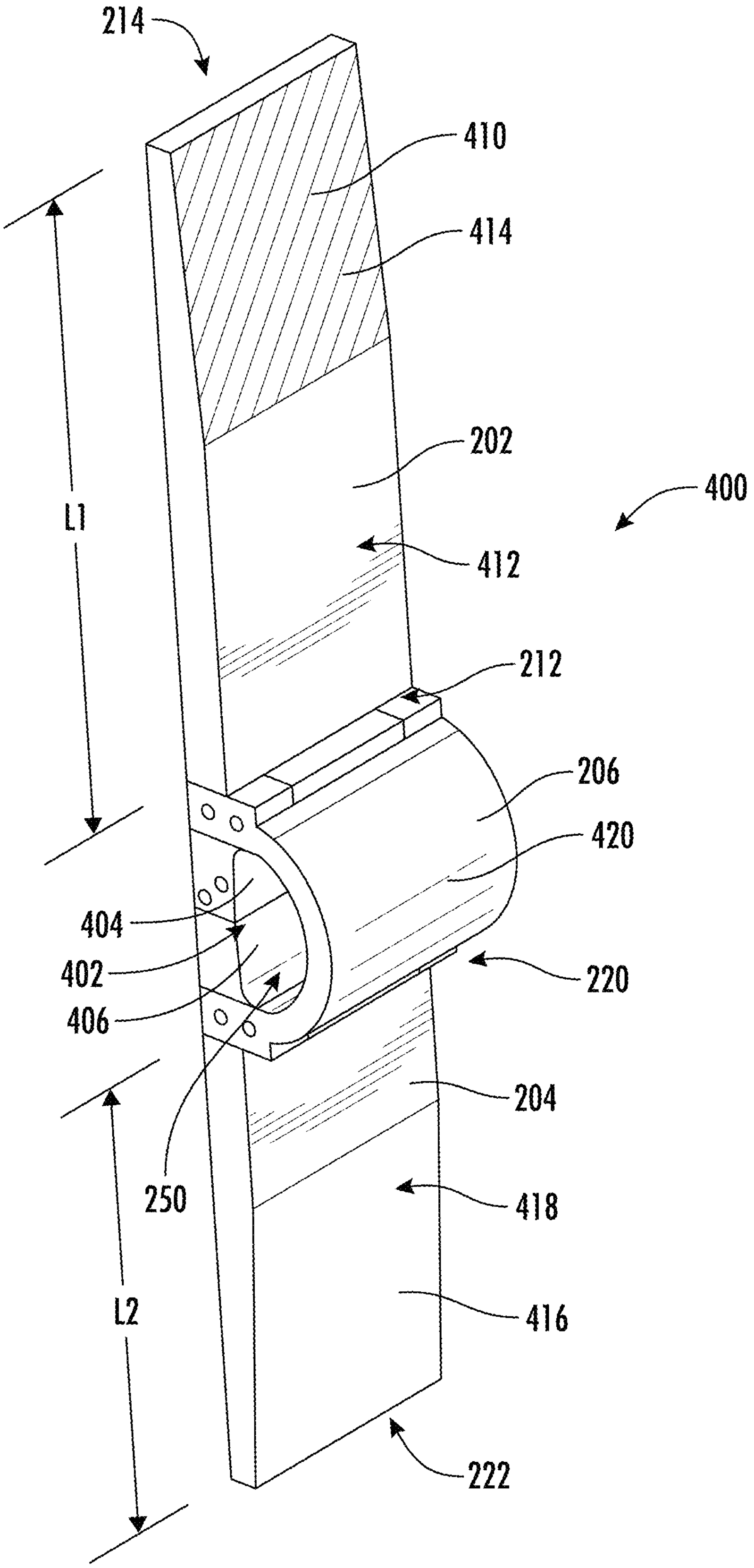
FIG. 8 provides a perspective view of another accessibility handle device according to one or more exemplary embodiments of the present subject matter.

Referring now to FIGS. 6 and 7, embodiments of the accessibility handle device 200 attached to door handles 150 of the refrigerator appliance 100 are provided. Specifically, FIG. 7 provides a perspective view of the accessibility handle device 200 in a horizontal orientation attached to the door handle 150 of the refrigerator door 126 and FIG. 8 provides a perspective view of the accessibility handle device 200 in a vertical orientation attached to the door handle 150 of the freezer door 128. As illustrated in FIGS. 7 and 8, the accessibility handle device 200 is in the first orientation. Thus, the second arm 204 may be engageable with the corresponding door of the refrigerator appliance 100 and the first arm 202 may be engaged by a user.

According to embodiments of the present subject matter, a user may engage the first arm 202 with one of their appendages, such as appendage 500. Specifically, as used herein "appendage" may correspond to an external body part, or natural prolongation, that protrudes from the user's body. For example, as illustrated in FIGS. 5 and 6, the appendage 500 may correspond to a forearm of the user. In some other embodiments, the appendage of the user is any other suitable external body part, or natural prolongation, that protrudes from the user's body. For example, in some other embodiments, the appendage is a leg, a foot, a chin, or the like.

As an illustrative example, to open a door (e.g., refrigerator door(s) 126 or freezer door 128) of the refrigerator appliance 100, a user may utilize their appendage 500 to apply an outward force to the first arm 202 of the accessibility handle device 200. Notably, when the outward force is applied to the first arm 202, the accessibility handle device 200 may pivot about the door handle 150 such that the second arm 204 engages with the door (e.g., refrigerator door(s) 126 or freezer door 128) of the refrigerator appliance 100. The second arm 204 may engage with the door and counteract the forces applied to the first arm 202. The second arms 204 counteracting force may advantageously lower the force required to open the door of the domestic appliance (e.g., when compared to a single armed accessibility handle device).

It is recognized that the accessibility handle device 200 may be pivotably attached to or positioned around any suitable domestic appliance. Specifically, aspects of the present subject matter may be applicable to any suitable domestic appliance that includes a door and a door handle for facilitating the movement of the door. Consequently, the description set forth herein is for illustrative purposes only and is not intended to be limiting in any aspect to any particular domestic appliance or configuration.

Figure 9:
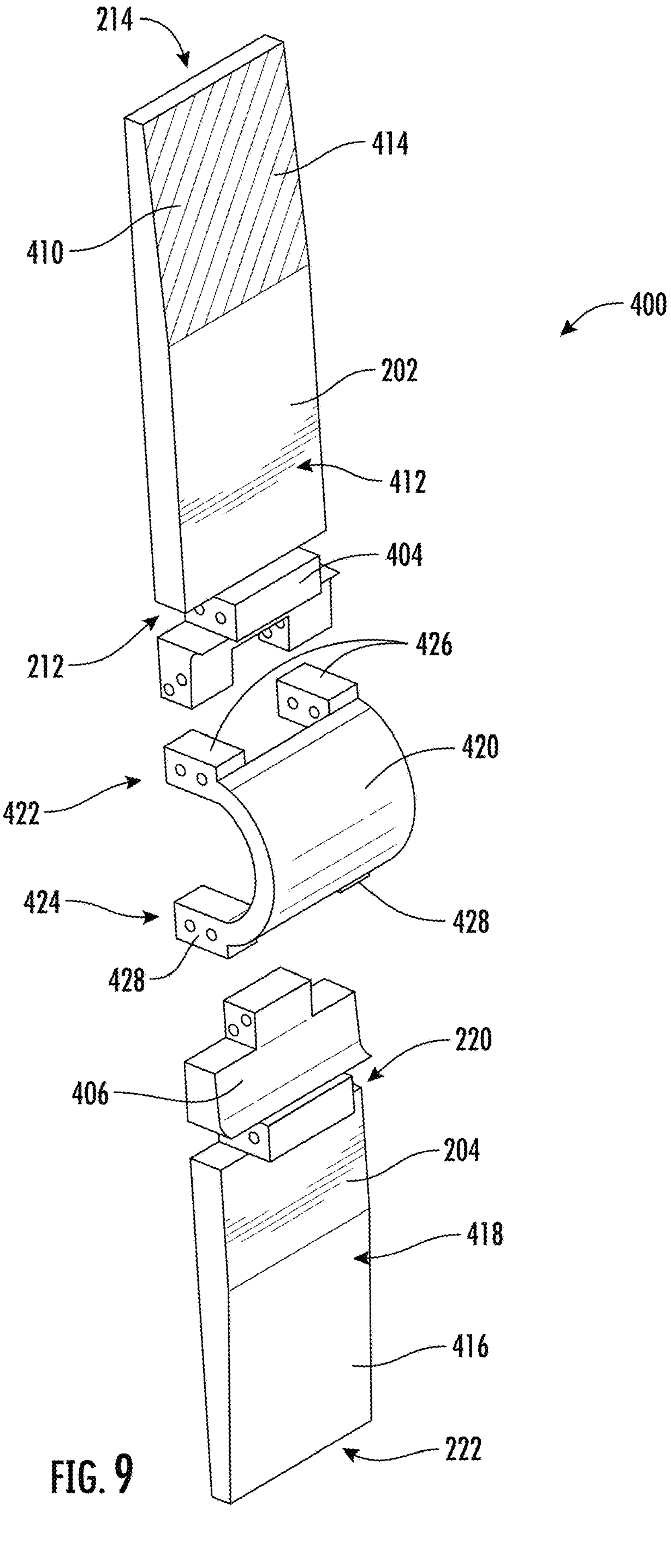
FIG. 9 provides an exploded view of the accessibility handle device of FIG. 8.

Referring now to FIGS. 8 and 9, views of an accessibility handle device 400 that may be attached to a door handle (e.g., door handle 150 of refrigerator appliance 100) according to one or more exemplary embodiments of the present subject matter are provided. Specifically, FIG. 8 provides a perspective view of the accessibility handle device 400 and FIG. 9 provides an exploded view of the accessibility handle device 400. The exemplary accessibility handle device 400 of FIGS. 8 and 9 may be configured in substantially the same manner as the exemplary accessibility handle device 200 of FIGS. 2 and 3, and accordingly, the same or similar numbers may refer to the same or similar parts.

For example, the exemplary accessibility handle device 400 of FIGS. 8 and 9 generally includes a first arm 202, a second arm 204, and a pivot body 206. In addition, the exemplary accessibility handle device 400 of FIGS. 8 and 9, defines a handle opening 250 that a door handle may be disposed through. However, for the embodiments of FIGS. 8 and 9, the first arm 202 and the second arm 204 may define an "in-line arrangement." For example, the first arm 202 may extend the pivot body 206 from in a first direction. The second arm 204 may extend in a second direction. The second direction may be opposite the first direction. For example, the first arm 202 and the second arm 204 may generally extend in line with one another such that a continuous arm of the accessibility handle device may generally be formed. Moreover, for the embodiments of FIGS. 8 and 9, the handle opening 250 may have a semi-circular cross-sectional area.

The first arm 202 may extend between a proximal end 212 and a distal end 214 along the first direction. The second arm 204 may extend between a proximal end 220 and a distal end 222 along a second direction. The first arm 202 may include a first attachment portion 404 at the proximal end 212 thereof. The second arm 204 may include a second attachment portion 406 at the proximal end 220 thereof. The first attachment portion 404 and the second attachment portion 406 may be attached (e.g., fastened, such as via mechanical fasteners being disposed through fasteners holes defined by the first attachment portion and the second attachment portion).

The first arm 202 may define a first length L1 between the proximal end 212 and the distal end 214 thereof. The second direction may be opposite of the first direction. For example, the first arm 202 and the second arm 204 may extend from the pivot body 206 in opposite directions to one another. The second arm 204 may define a second length L2 between the proximal end 220 of the second arm 204 and the distal end 222 of the second arm 204. In some embodiments, the first length L1 defined by the first arm 202 is larger than the second length defined by the second arm 204. For example, the first length L1 may be at least twenty-five percent (25%) larger than the second length L2, such as at least thirty-five percent (35%) larger than the second length L2, such as at least fifty percent (50%) larger than the second length L2.

The first arm 202 may define a first engagement portion 410. The first engagement portion 410 may be at an inner surface 412 of the first arm 202. The first engagement portion 410 may be positioned at or proximate to the distal end 214 of the first arm 202. A user may engage with the first engagement portion 410. The first engagement portion 410 includes a user contact material 414. The user contact material 414 may be a material that is distinct and different from the material of the first arm 202. For example, the first arm 202 and the second arm 204 may include an arm material. The arm material may include a rigid material. For example, the arm material may include a rigid plastic material such acrylonitrile butadiene styrene (ABS), polycarbonate, polyethylene, or the like. The user contact material 414 may be a soft material that a user may engage with when utilizing the accessibility handle device 400 to open or close the door of the domestic appliance. For example, the user contact material may include rubber, foam, or any other suitable material that a user may comfortably engage with.

The second arm 204 may define a second engagement portion 416 at an inner surface 418 of the second arm 204. The second engagement portion 416 may be positioned at or proximate to the distal end 222 of the second arm 204. In some embodiments, the first engagement portion 410 or the second engagement portion 416 is engageable with a door of the domestic appliance. The other of the first engagement portion 410 or the second engagement portion 416 may be engaged by a user (e.g., an appendage of the user).

When attached, the first attachment portion 404 and the second attachment portion 406 may form a pivot base 402 of the pivot body 206. The pivot body 206 may include an arcuate body 420 that is attached to the pivot base 402. The arcuate body 420 may extend between a first end 422 and a second end 424. The first end 422 may include one or more attachment members 426 extended therefrom. The second end 424 may include one or more attachment members 428 extended therefrom. The one or more attachment members 426 of the first end 422 may be attached to the first attachment portion 404 of the first arm 202. The one or more attachment members 428 of the second end 424 may be attached to the second attachment portion 406 of the second arm 204. The first arm 202 and the second arm 204 may be attached together to form a pivot base 402 of the pivot body.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An accessibility handle device for a domestic appliance comprising a door, the door comprising a door handle, the accessibility handle device comprising:

a pivot defining a handle opening, the accessibility handle device being pivotably disposed around the door handle at the handle opening;

a first arm extending from the pivot in a first direction, the first arm being tangential to the handle opening; and a second arm extending from the pivot in a second direction, the second arm being tangential to the handle opening, the second direction being opposite the first direction;

wherein the first arm and the second arm are positioned in a parallel arrangement.

2. The accessibility handle device of claim 1, wherein one of the first arm or the second arm is engageable with the door of the domestic appliance.

3. The accessibility handle device of claim 1, wherein the first arm extends between a first proximal end and a first distal end, wherein the first arm defines a first length between the first proximal end and the first distal end, wherein the second arm extends between a second proximal end and a second distal end, wherein the second arm defines a second length between the second proximal end and the second distal end, and wherein the first length is larger than the second length.

4. The accessibility handle device of claim 3, wherein the first length is at least twenty five percent larger than the second length.

5. The accessibility handle device of claim 1, wherein the first arm or the second arm comprise an arm material, wherein the first arm or the second arm comprises an engagement portion, wherein the engagement portion is disposed at a distal end of the first arm or the second arm, and wherein the engagement portion comprises a user contact material that is different than the arm material.

6. An accessibility handle device for a domestic appliance comprising a door, the door comprising a door handle, the accessibility handle device comprising:

a pivot defining a handle opening, the handle opening having a circular cross-sectional area, the accessibility handle device being pivotably disposed around the door handle at the handle opening such that the door handle extends through the circular cross-sectional area of the handle opening;

a first arm extending from the pivot in a first direction, the first arm being tangential to the handle opening; and a second arm extending from the pivot in a second direction, the second arm being tangential to the handle opening, the second direction being opposite to the first direction;

wherein the first arm and the second arm are positioned in a parallel arrangement; and wherein one of the first arm or the second arm is engageable with the door.

7. The accessibility handle device of claim 6, wherein the pivot comprises a first arcuate body and a second arcuate body, and wherein the first arcuate body is fastened to the second arcuate body.

8. The accessibility handle device of claim 7, wherein the first arcuate body extends between a first end and a second end, wherein the second arcuate body extends between a first end and a second end, wherein the first end of the first arcuate body is fastened to the first end of the second arcuate body, and wherein the second end of the first arcuate body is fastened to the second end of the second arcuate body.

9. The accessibility handle device of claim 6, wherein the first arm extends between a first proximal end and a first distal end, wherein the first arm defines a first length between the first proximal end and the first distal end, wherein the second arm extends between a second proximal end and a second distal end, wherein the second arm defines a second length between the second proximal end and the second distal end, and wherein the first length is larger than the second length.

10. The accessibility handle device of claim 9, wherein the first length is at least twenty five percent larger than the second length.

11. The accessibility handle device of claim 6, wherein the first arm or the second arm comprises an engagement portion, wherein the engagement portion is disposed at a distal end of the first arm or the second arm, and wherein the engagement portion comprises a user contact material that is different than a material of the first arm or the second arm.

* * * * *